US010915926B2

(12) United States Patent
McDevitt et al.

(10) Patent No.: US 10,915,926 B2
(45) Date of Patent: Feb. 9, 2021

(54) SYSTEMS AND METHODS FOR LOCATION-BASED ADVERTISING

(71) Applicant: MapQuest, Inc., Denver, CO (US)

(72) Inventors: Patrick Allan McDevitt, Hanover, NH (US); G. Duane Gearhart, Hummelstown, PA (US); John Patrick O'Dwyer, Denver, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 636 days.

(21) Appl. No.: 13/714,185

(22) Filed: Dec. 13, 2012

(65) Prior Publication Data

US 2014/0006160 A1     Jan. 2, 2014

Related U.S. Application Data (60) Provisional application No. 61/666,310, filed on Jun. 29, 2012.

(51) Int. Cl.
    *G06Q 30/02*    (2012.01)

(52) U.S. Cl.
    CPC ..... *G06Q 30/0259* (2013.01); *G06Q 30/0251* (2013.01); *G06Q 30/0261* (2013.01)

(58) Field of Classification Search
    CPC .................. G06Q 30/0266; G01C 21/3679
    See application file for complete search history.

(56) References Cited

U.S. PATENT DOCUMENTS

| 7,599,795 | B1 * | 10/2009 | Blumberg | .............. | G01C 21/20 |
| | | | | | 701/426 |
| 7,657,372 | B2 | 2/2010 | Adachi et al. | | |
| 7,689,355 | B2 | 3/2010 | Abernethy et al. | | |

(Continued)

FOREIGN PATENT DOCUMENTS

| EP | 2290325 | 3/2011 |
| EP | 2447923 | 5/2012 |

(Continued)

OTHER PUBLICATIONS

Imad Afyouni, Cyril Ray, Claramunt Christophe. Spatial models for context-aware indoor navigation systems: A survey. Journal of Spatial Information Science, 2012, 1 (4), pp. 85-123. ff10.5311/JOSIS.2012.4.73ff. ffhal-00731055f (Year: 2012).*

(Continued)

*Primary Examiner* — Michael Bekerman
*Assistant Examiner* — Scott Snider (57) ABSTRACT

Systems and methods are provided for location-based advertisements. In accordance with one exemplary implementation, a method is provided for providing advertisements to a user of a navigation system. The method may include identifying high-value intersections in a map. The method may also include identifying, based on the high-value intersections, a set of landmark locations and associating the landmark locations with the high-value intersections in a database. The method may also include detecting at least one of the high-value intersections in a route requested by the user. The method may also include presenting, on a device of the user, an advertisement associated with at least one landmark location while presenting maneuver information for the at least one high-value intersection.

24 Claims, 9 Drawing Sheets

(56) References Cited

U.S. PATENT DOCUMENTS

| | | | |
|---|---|---|---|
| 8,473,194 B2 * | 6/2013 | Irish | G06Q 30/0282 |
| | | | 701/409 |
| 8,509,411 B2 * | 8/2013 | Laine | H04L 67/26 |
| | | | 379/207.12 |
| 8,745,041 B1 * | 6/2014 | Katragadda | G06F 17/30241 |
| | | | 701/426 |
| 2003/0130788 A1 * | 7/2003 | Akashi | 701/209 |
| 2005/0004753 A1 * | 1/2005 | Weiland | G01C 21/32 |
| | | | 701/532 |
| 2007/0078596 A1 * | 4/2007 | Grace | G01C 21/3476 |
| | | | 701/533 |
| 2007/0083428 A1 | 4/2007 | Goldstein | |
| 2007/0143345 A1 * | 6/2007 | Jones et al. | 707/104.1 |
| 2007/0161382 A1 | 7/2007 | Melinger et al. | |
| 2008/0262717 A1 | 10/2008 | Ettinger | |
| 2009/0006336 A1 | 1/2009 | Forstall et al. | |
| 2009/0234711 A1 * | 9/2009 | Ramer et al. | 705/10 |
| 2010/0023257 A1 * | 1/2010 | Machino | 701/201 |
| 2010/0138294 A1 | 6/2010 | Bussmann et al. | |
| 2011/0040626 A1 * | 2/2011 | Lin | 705/14.63 |
| 2011/0153427 A1 * | 6/2011 | Crolley | G06Q 30/0261 |
| | | | 705/14.58 |
| 2011/0238301 A1 | 9/2011 | Lee | |
| 2012/0059720 A1 | 3/2012 | Musabji et al. | |
| 2012/0197714 A1 * | 8/2012 | Beyeler et al. | 705/14.49 |
| 2014/0052370 A1 * | 2/2014 | Watanabe | G01C 21/3638 |
| | | | 701/428 |

FOREIGN PATENT DOCUMENTS

| | | |
|---|---|---|
| WO | WO 01/61671 A1 | 8/2001 |
| WO | 2008/147006 | 12/2008 |

OTHER PUBLICATIONS

Tuan Hung Dao, Seung Ryul Jeong, Hyunchul Ahn, A novel recommendation model of location-based advertising: Context-Aware Collaborative Filtering using GA approach, Expert Systems with Applications, vol. 39, Issue 3, 2012, pp. 3731-3739, ISSN 0957-4174 (Year: 2012).*

Google Ads, Ad Words—On-line advertising by Google; "A quick look at ads on Google," downloaded from <http://www.google.com/adwords/how-it-works/ads-on-google.html#subid=ww-et-awhp_nelsontest3_nel_p.> on Mar. 13, 2013, 1 page.

International Search Report and Written Opinion of the International Searching Authority, for corresponding International Application No. PCT/US12/69447, dated Oct. 11, 2013 (9 pages).

* cited by examiner

SYSTEMS AND METHODS FOR LOCATION-BASED ADVERTISING

This application claims the benefit of U.S. Provisional Application No. 61/666,310, filed Jun. 29, 2012, which is expressly incorporated herein by reference to its entirety.

TECHNICAL FIELD

The present disclosure relates generally to systems and methods for advertising. More particularly, and without limitation, the present disclosure relates to systems and methods for location-based advertising, including systems and methods that generate ads for display in a navigation or mobile device.

BACKGROUND

Today, navigation systems are widely used to provide routing guidance to a particular destination. Electronic map displays have become widely used to convey information about roads, traffic, buildings, landmarks, terrain, etc. related to a particular geographical region of interest. Because of their versatility, electronic map displays are used in a variety of different systems and applications. For example, electronic map displays are used in personal navigation and mobile devices to convey driving and/or walking directions to the user. In addition, electronic map displays or applications are available from variety of sources (e.g., www.mapquest.com) for use by the public.

Navigation systems, including handheld navigation devices and mobile phones with navigation applications, often use landmarks as cues in delivering route guidance. Intersections prompting a route change may contain a variety of landmarks, such as hotels, restaurants, gas stations, etc. In addition, or alternatively, navigation systems may use these businesses as cues to the driver for a route change (e.g., "Turn left at Starbucks").

Because greater numbers of people are using online and mobile navigation systems, there exists great benefit in commercializing navigation guidance by providing advertising of local businesses in a guided route. Navigation systems may create advertising placements in a guided route based on the current location of the user or the particular routing directions. Because businesses increasingly take advantage of Internet traffic by advertising their products or services online, they may also seek to take advantage of the increased use of online and mobile navigation systems to advertise their products or services in those mediums.

The present disclosure is directed to improved systems and methods for location-based advertising, including improved systems and methods for providing online and mobile advertising in a guided route of a navigation system or mobile device. Moreover, the present disclosure is directed to improved techniques for providing location-based landmark advertising on a navigation display of, for example, a handheld navigation device, a mobile phone, or an onboard navigation system of a vehicle.

SUMMARY

Consistent with the present disclosure, systems, methods, and computer-readable media are provided for location-based advertising. Embodiments consistent with the present disclosure include, for example, computerized systems and methods that can generate ads for display in a navigation or mobile device.

In accordance with one disclosed exemplary embodiment, a method is provided for location-based advertisements to a user of a navigation system. According to the method, the method may identify high-value intersections in a map. They method may also identify, based on the high-value intersections, a set of landmark locations. The landmark locations may be associated with the high-value intersections in a database. At least one processor may detect at least one of the high-value intersections in a route requested by the user. The method may also present, on a device of the user, an advertisement associated with at least one landmark location while presenting maneuver information for the at least one high-value intersection.

In accordance with another disclosed exemplary embodiment, a method is provided for location-based advertisements to a user of a navigation system. The method may detect, by at least one processor, the presence of a user near a high-value location. The method may also offer an advertisement space for the high-value location, the advertisement space being associated with navigation information presented to the user. Payment may be received for the advertisement space. The method may also present, in connection with the paid advertisement space, an advertisement for display with the navigation information presented to the user.

In accordance with yet another disclosed exemplary embodiment, a system is provided for providing location-based advertisements to a user of a navigation system. The system may comprise a processor and a memory a memory storing instructions which, when executed by the processor, cause the processor to identify high-value intersections in a map. A set of landmark locations may also be identified, based on the high-value intersections. The landmark locations may be associated with the high-value intersections in a database. The processor may detect at least one of the high-value intersections in a route requested by the user. An advertisement associated with at least one landmark location may be presented, on a device of the user, while presenting maneuver information for the at least one high-value intersection.

In accordance with an additional disclosed exemplary embodiment, a system is provided for providing location-based advertisements to a user of a navigation system. The system may comprise a processor and a memory a memory storing instructions which, when executed by the processor, cause the processor to detect the presence of a user near a high-value location. An advertisement space may be offered for the high-value location, the advertisement space being associated with navigation information presented to the user. Payment may be received for the advertisement space. The processor may present, in connection with the paid advertisement space, an advertisement for display with the navigation information presented to the user.

Persons skilled in the art will appreciate that the conception upon which this disclosure is based may readily be utilized as a basis for designing other structures, methods, and systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION OF THE EMBODIMENTS

Reference will now be made in detail to exemplary embodiments, examples of which are illustrated in the accompanying drawings. Wherever possible, the same reference numbers will be used throughout the drawings to refer to the same or like parts.

Figure 1:
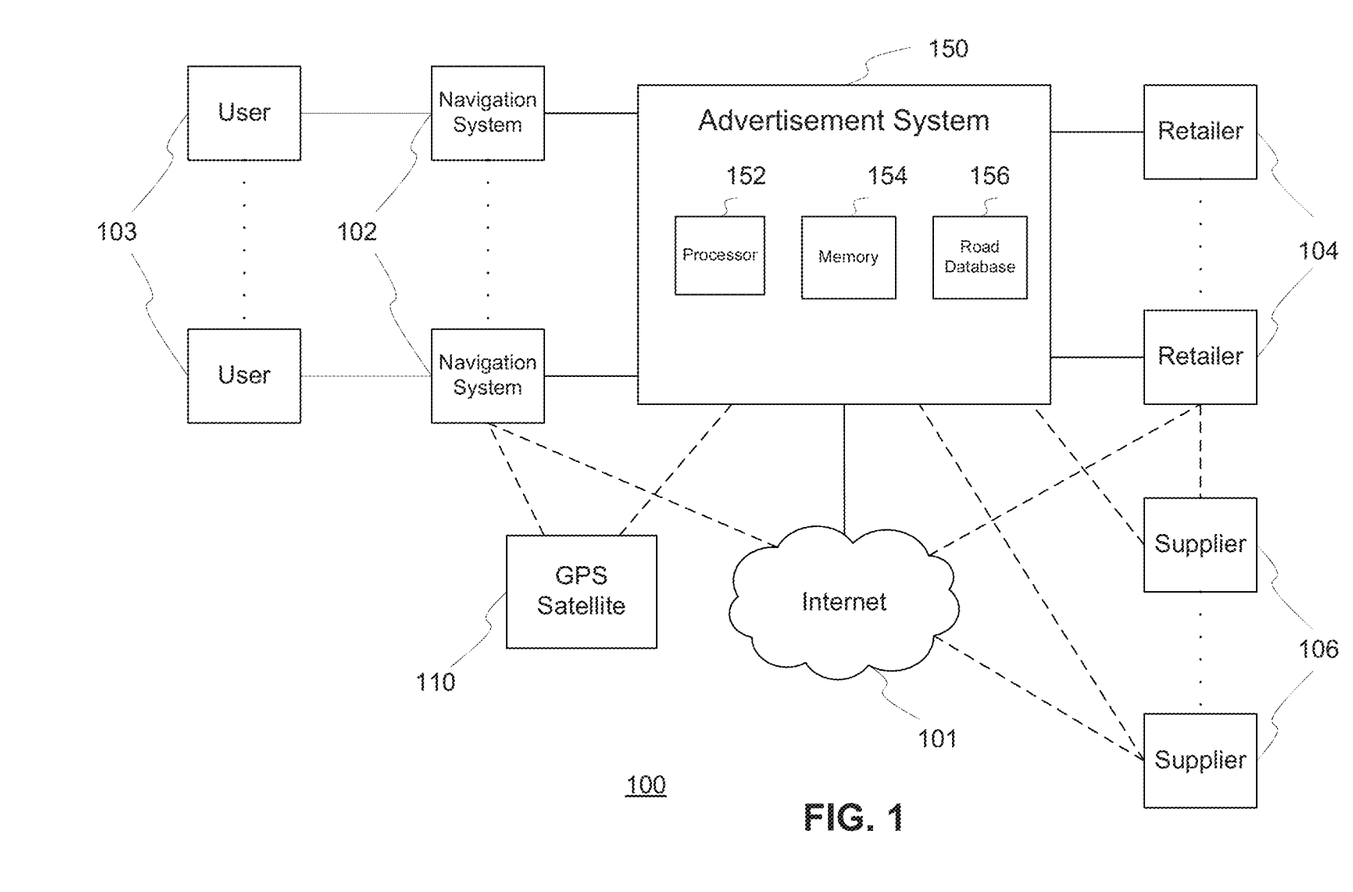
FIG. 1 depicts a block diagram of an exemplary system environment in which embodiments consistent with the present disclosure may be practiced and implemented.

FIG. 1 illustrates an exemplary system environment 100 in which embodiments consistent with the present disclosure may be practiced and implemented. As further disclosed herein, environment 100 of FIG. 1 may be used for generating and displaying location-based advertising displays to users of a navigation system. As shown in FIG. 1, system environment 100 may include one or more navigation systems 102, users 103, retailers 104, and suppliers 106. One or more advertisement systems 150 may also be provided. All of these components of system environment 100 may be disposed for communication with one another via an electronic network, such as the Internet 101 and/or other communication networks.

As will be described in more detail below, in certain embodiments, advertisement system 150 may be configured to receive payment from entities (such as retailers 104 and suppliers 106) and generate advertisements for display to users 103 of navigation systems 102. Advertisement space may be location-based. For example, an advertisement space may be associated with a physical store of a retailer 104. The physical store may be associated with a particular landmark or intersection on a map and a guided maneuver of a route for user 103 of navigation system 102. An advertisement for retailer 104 may be displayed or otherwise presented to user 103 in combination with the route information, including the guided maneuver associated with the particular landmark or intersection.

Consistent with embodiments of the present disclosure, advertisement system 150 may be configured to determine a location or intersection in user 103's route and display a particular retailers 104's or supplier 106's advertisement as being associated with that location or intersection. In other embodiments, advertisement system 150 may be configured to determine a particular intersection as valuable and display a particular retailer 104's or supplier 106's advertisement when a user 103 is physically present or near that intersection. For example, an intersection may be determined as high-value due to high traffic volume or frequency of use in navigated route, such as exits off an interstate or four-way stops in dense, metropolitan areas. Additionally, advertisement system 150 may be configured to analyze demographic information associated with a particular intersection for determining whether the intersection is high-value. For example, advertisement system 150 may analyze demographic information associated with an intersection near a large shopping center. This information may include the volume of traffic at the location or intersection or various demographic information relating to the visitors at the location or intersection, such as age, gender, nationality, household income, vehicle identification information, frequency of visiting intersection, and the like. Other demographic information may also be obtained for profiling and targeting users 103 and/or determining whether the intersection has a high value.

Navigation system 102 may be any navigation system that delivers route guidance to users 103. Navigation systems 102 include, for example, handheld navigation devices and mobile phones with navigation applications. Navigation system 102 may obtain and track a user's (such as user 103) location based on data from, for example, one more GPS satellites 110. In some embodiments, other sources are used to track a user's location, such as sensors, gyroscopes, or mobile phone networks (not shown). Location data related to users 103 may be provided to advertisement system 150 via navigation systems 102 and/or directly from sources, such as GPS satellites 110, mobile phone networks (not shown), etc.

In some embodiments, navigation systems 102 may include route guidance applications or services, such as those accessible via a web site. Navigation systems 102 may also support mobile navigation applications or devices of users 103, such as onboard navigation systems of vehicles, handheld navigation devices, and mobile phones with navigation applications (not shown).

With respect to FIG. 1 and the other exemplary embodiments disclosed herein, the term "user" may refer to any consumer, viewer, or visitor of a web page or site, a mobile navigation application, or an in-vehicle navigation system supported by navigation systems 102. References to users "viewing" ads are meant to include any presentation, whether electronic or digital, virtual, or tangible (such as a print-out).

Retailers 104 may include any entity that provides goods or services and desires to deliver advertisements to users 103. Retailers 104 may have physical stores at or otherwise associated with a location, such as an intersection or landmark. For example, retailers 104 may have, or be associated with, restaurants, hotels, gas stations, fitness centers, salons, cafes, and other points of interest represented in a map and/or database. Retailers 104 may also consist of consumer goods stores, such as shopping outlets, electronics shops, and grocery stores. In other embodiments, retailers 104 may not necessarily have a physical store, but may include businesses that are interested in advertising at an intersection or other location. Retailers 104 may interact with advertisement system 150 in system environment 100 either directly or through the Internet 101.

Suppliers 106 may include any entity that provides products or support services sold by retailers 104 or other businesses or entities. For example, suppliers 106 may consist of manufacturers, distributors, or wholesalers of consumer goods, which are sold by a retailer, such as Wal-Mart, in a physical store. Suppliers 106 may interact with retailers 104 in environment 100 either directly, through advertisement system 150, or through the Internet 101. In some embodiments, suppliers 106 may communicate information, such as product information or coupons, to retailers 104 for use in an advertisement through advertisement system 150.

Advertisement system 150 may include one or more processors 152, memory devices 154, and road databases 156. Road database 156 may comprise data used to generate maps including roads (e.g., streets, highways, etc) and/or navigational information for a route. Road database 156 may comprise a digital map database. Road database 156 may also include road-related information, such as intersection locations and highway exits. Road database 156 may also include information used to determine high-value intersections (HVIs), such as highway exits and intersections between major arterials in commercial areas. This information may include historic traffic volumes and/or the likelihood or frequency of being involved in a guidance maneuver in navigated routes for users. Road database 156 may also store demographic information for users 103 that frequently travel to or request routes related to HVIs and other locations, such as the age, gender, nationality, and household income of such users.

Memory 154 may store a set of programmable instructions that are executable by processor 152 to enable the operations of advertising system 150, as disclosed herein. Additionally, memory 154 may be used for recording or otherwise storing information related to the operations of advertising system 150, such as identified HVIs or other locations, landmarks, associated advertisement spaces, prices for advertisement spaces, advertisements, ad campaign information, profile information for ad targeting, geocodes, metadata, etc.

Processor 152 may be configured to execute the set of programmable instructions in memory 154 and use the information stored in road database 156 (and memory 154, where needed) to determine HVIs for delivering ads in advertisement system 150. Processor 152 may also be configured to geocode these HVIs with metadata, including the classification of the intersecting roads, the latitude and longitude of the intersection, the names of the intersecting roads, and other attributes such as corresponding traffic messaging channel (TMC) codes, open location referencing (OpenLR) codes, and/or other attributes.

Processor 152 may also be configured to identify landmarks and other locations (collectively "landmarks") surrounding each HVI and to generate a list of candidate landmarks. Processor 152 may determine these landmark locations from vendors, public sources (such as Open Street Map), or third-party business partners. These landmark locations can be assigned an accurate latitude/longitude for proper placement on a map generated with road database 156. Processor 152 may query for the landmark locations around each HVI based on distance or on time. For example, the query might consist of a 1-mile radius or a 10-minute driving radius around the HVI. Memory 154 stores the list of candidate landmarks associated with each HVI in a database. The candidate list may be updated on a regular basis, such as daily, weekly, or monthly.

Figure 2:
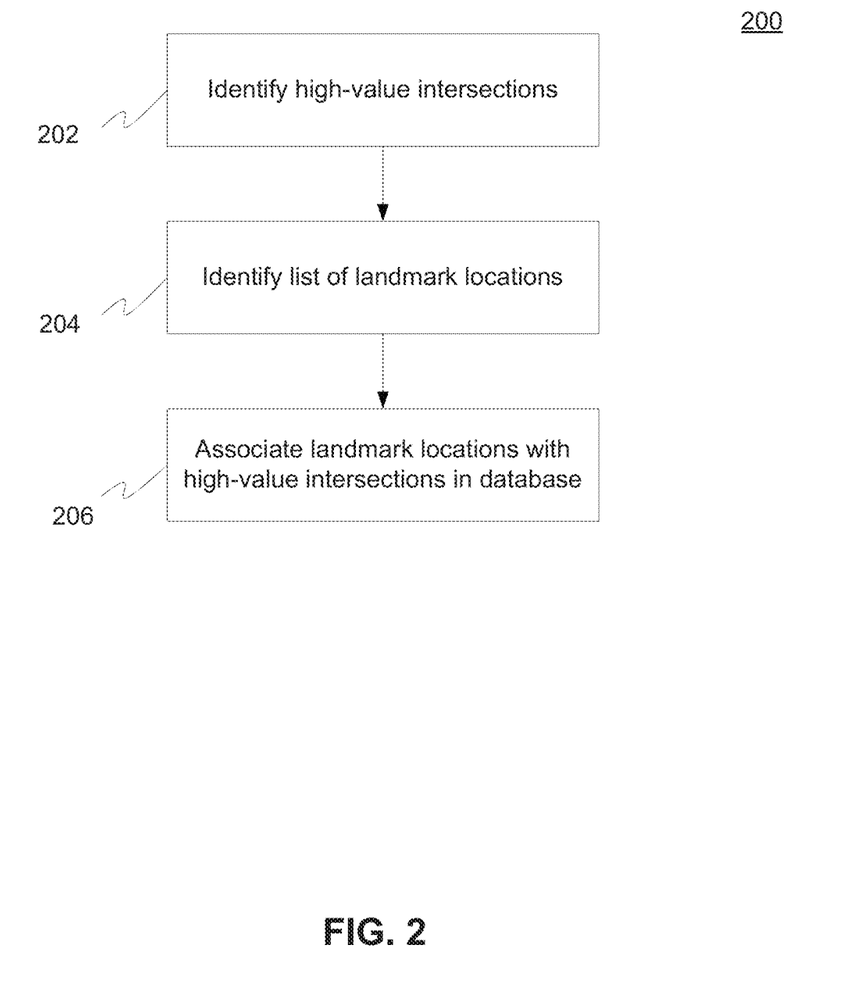
FIG. 2 depicts a flowchart of an exemplary method for generating a database of location-based landmarks.

FIG. 2 depicts a flowchart of an exemplary method 200 for generating a database of landmark locations for displaying advertisements using, for example, advertisement system 150 of FIG. 1. Method 200 may include identifying HVIs in a map of roads, such as highway exits or intersections between major arterials in commercial areas (step 202). Method 200 may also include identifying landmark locations surrounding each HVI (step 204). In step 204, processor 152 (FIG. 1) may access either memory 154 or road database 156 to determine the landmark locations surrounding each HVI. The landmark locations may include a list of businesses within a predetermined distance (e.g., 1-mile radius) around each HVI, within a predetermined time (e.g., 10-minute driving radius) around each HVI, or otherwise based on addresses surrounding each HVI (e.g., within a zip code or a range of street addresses). The list of businesses may include retailers 104 (FIG. 1) that have a physical location near an HVI and/or suppliers 106 that supply products or supporting services to retailers 104 at their physical locations. Method 200 (FIG. 2) may also include querying retailers 104 or suppliers 106 who do not necessarily have an identified physical location near the HVI, but who may desire to advertise to users at the HVI. For those retailers 104 and suppliers 106 who wish to advertise, additional landmarks may be identified and recorded. Method 200 may also include associating the identified landmark locations with their respective HVIs in a database (step 206). Such information may be stored in memory 154 and/or road database 156.

Figure 3:
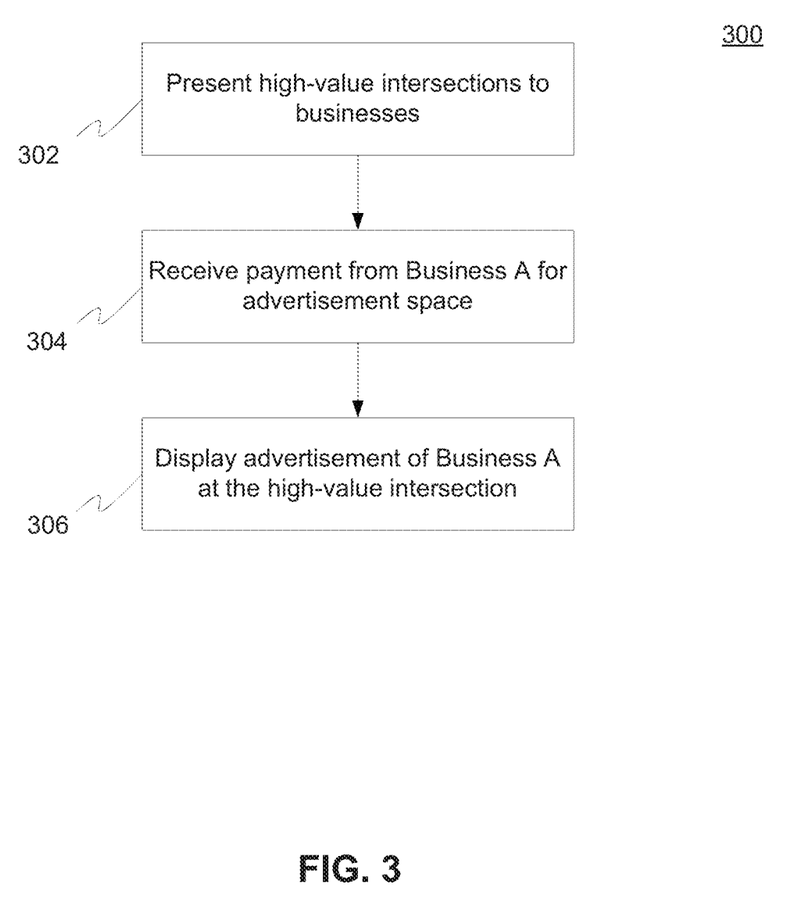
FIG. 3 depicts a flowchart of an exemplary method for generating location-based advertising displays.

FIG. 3 depicts a flowchart of an exemplary method 300 for generating advertisements using, for example, advertisement system 150 of FIG. 1. Method 300 may include presenting a high-value intersection to at least one business associated with the high-value intersection (step 302). The business, such as retailer 104 or supplier 106, may be associated with the high-value intersection because, for example, they have a physical store or other location present near the high-value intersection or they supply or support goods or services sold at such a location. In other embodiments, the business may be associated with the high-value intersection because they desire to place advertisements in relation to the high-value intersection.

In certain embodiments, the presenting (step 302) may include offering, in exchange for a fee, advertisement space to present an ad to users 103 at the high-value intersection. In other embodiments, the presenting (step 302) may include auctioning, by advertisement system 150, the advertisement space to a business or other entity that is willing to pay the highest price for the advertisement space. An advertisement space associated with an HVI or other location may also be sold and/or allocated according to an advertising campaign of a business or other entity, such as retailer 104 or supplier 106. An advertising campaign may include price levels or maximum fees that the entity is willing to pay for an advertisement space associated with one or more specific HVIs or locations.

Method 300 may also include receiving payment from at least one business or other entity for the advertisement space (step 304). The payment may be made by the entity, such as Business A, either before or after an advertisement is placed. In the event that there is an auction for the advertisement space, Business A may be the highest bidder determined by advertisement system 150. The payment may also be from multiple businesses for HVIs or other locations, where multiple advertisements may be displayed by advertisement system 150.

Method 300 may also include displaying or otherwise presenting the advertisement of the business that paid for the advertisement space when any user 103 (or only specific users matching a targeting profile) is present near the HVI (step 306). For example, in step 306, an advertisement for Business A may be displayed or otherwise presented when user 103 is near the HVI. Alternatively, the advertisement may be displayed to user 103 when navigation information for the specific HVI or other location is presented to user 103 (i.e., not necessarily when the user 103 is located at or present near the HVI).

Figure 4:
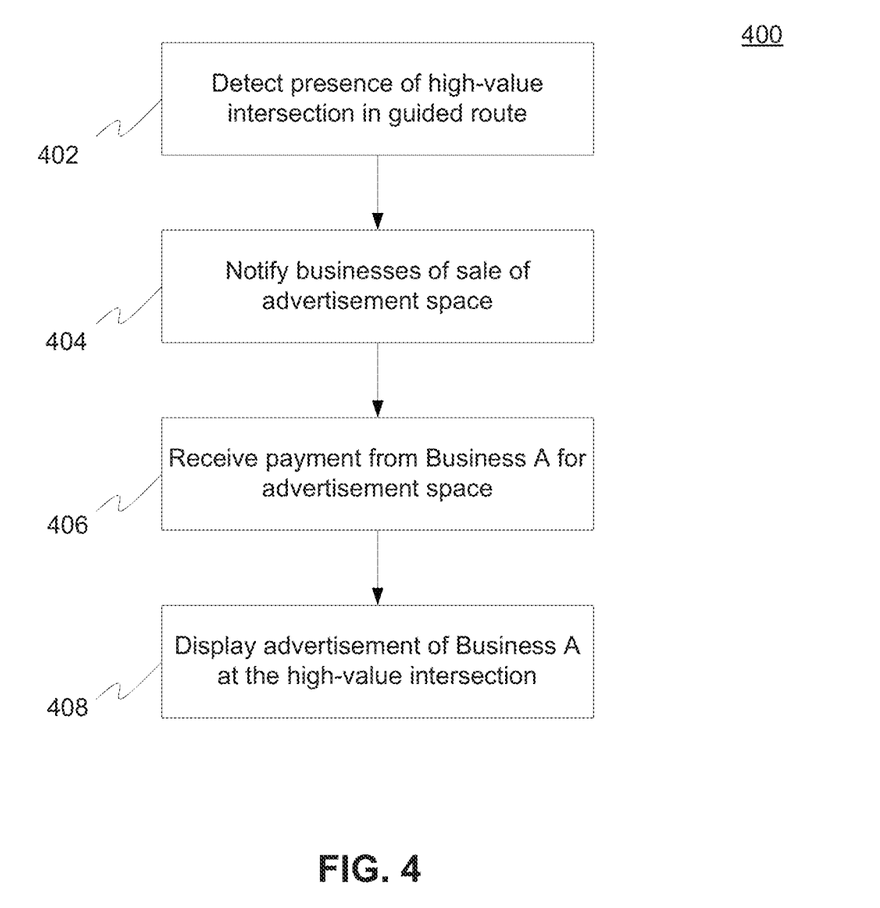
FIG. 4 depicts a flowchart of another exemplary method for generating location-based advertising displays.

FIG. 4 depicts a flowchart of another exemplary method 400 for generating advertisements using, for example, advertisement system 150 of FIG. 1. Method 400 may include detecting, by advertisement system 150, the presence of a high-value intersection in a route of user 103 (step 402). For example, advertisement system 150 (FIG. 1) may determine that a user 103 is present near a particular HVI in a navigated route by using signals from GPS satellites 110. Alternatively, advertisement system 150 may select a particular HVI from a list of guidance maneuvers provided to user 103 in a route to a particular destination (e.g., in response to user 103's query without user 103 being present near the HVI, such as in a tangible list of guidance maneuvers or in a list provided on a website). Advertisement system 150 may notify at least one business (such as retailer 104 or supplier 106) associated with the HVI and offer the advertisement space for presenting an ad to user 103 (step 404). For example, advertisement system 150 may notify retailers 104 or suppliers 106 through electronic messaging via a network, such as Internet 101, or directly through advertisement system 150. Advertisement system 150 may notify retailers 104 or suppliers 106 when user 103 matches a particular profile designated by retailers 104 or suppliers 106 or by their advertising campaign.

Method 400 may also include receiving payment from at least one business or other entity for the advertisement space associated with the high-value intersection (step 406). Method 400 may also include displaying a representation (see, e.g., FIGS. 5-9) of the ad for the business or other entity that paid for the advertisement space (step 408).

Consistent with embodiments of the present disclosure, the receipt of the payment in exemplary method 400 may be made before or after an advertisement is displayed or otherwise presented to user 103. In addition, an advertisement space may be sold and/or allocated according to an advertising campaign of an entity (such as a retailer 104 or supplier 106). As noted above, an advertising campaign may include price levels or maximum fees that the entity is willing to pay for an advertisement space associated with a specific location or any user 103 (or only specific users matching a targeting profile).

Figure 5:
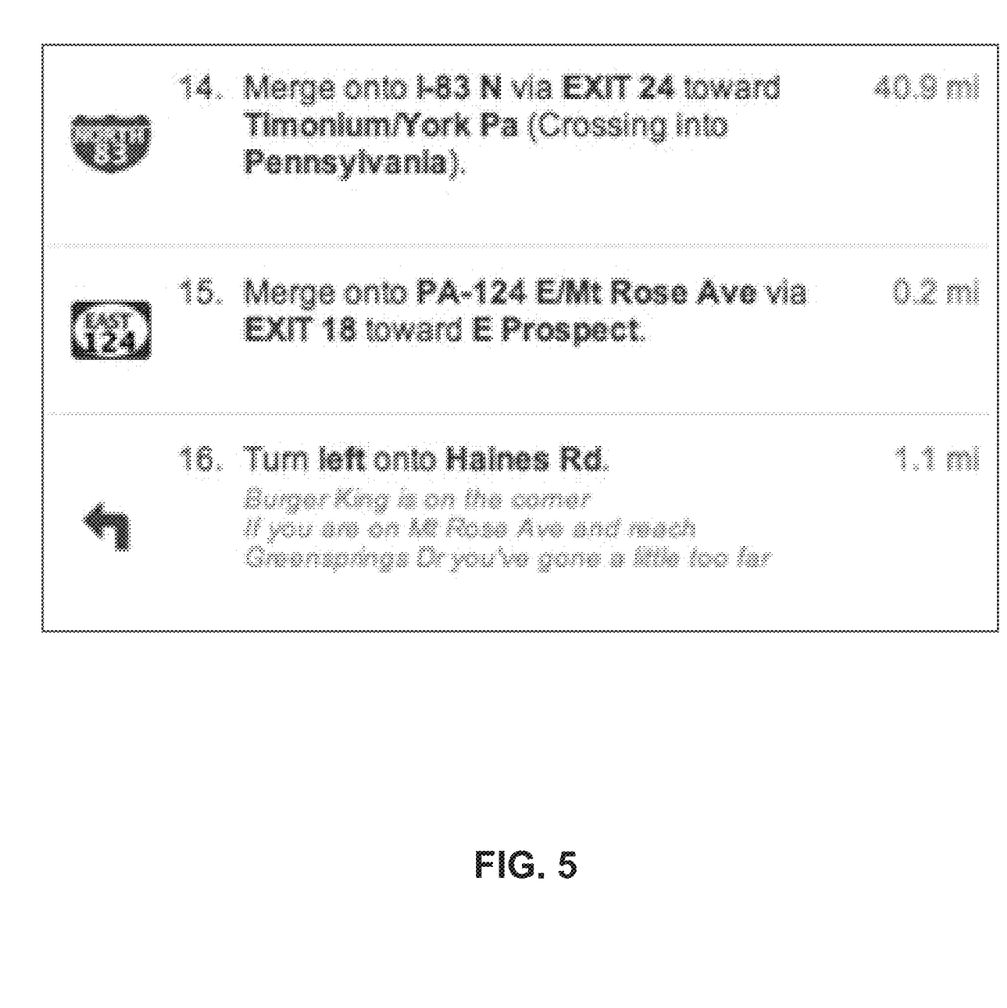
FIG. 5 depicts an exemplary advertisement that may be generated with systems and methods consistent with embodiments of the present disclosure.

FIG. 5 depicts an exemplary advertisement that may be generated with systems and methods consistent with embodiments of the present disclosure. The exemplary advertisement of FIG. 5 includes an area for a textual placement of a landmark location associated with a guidance maneuver in a route. For example, at guidance maneuver 16, a text placement of a landmark location, Burger King, may be displayed and associated with the route maneuver of "Turn left onto Halnes Rd." The exemplary advertisement of FIG. 5 may be presented via the display of a users' handheld navigation device, mobile phone, or onboard vehicle navigation system. Alternatively, the exemplary advertisement of FIG. 5 may be presented in a list of guidance maneuvers provided to user 103 in a route to a particular destination (e.g., in a tangible list of guidance maneuvers or via a website associated with a mobile phone or computer).

Figure 6:
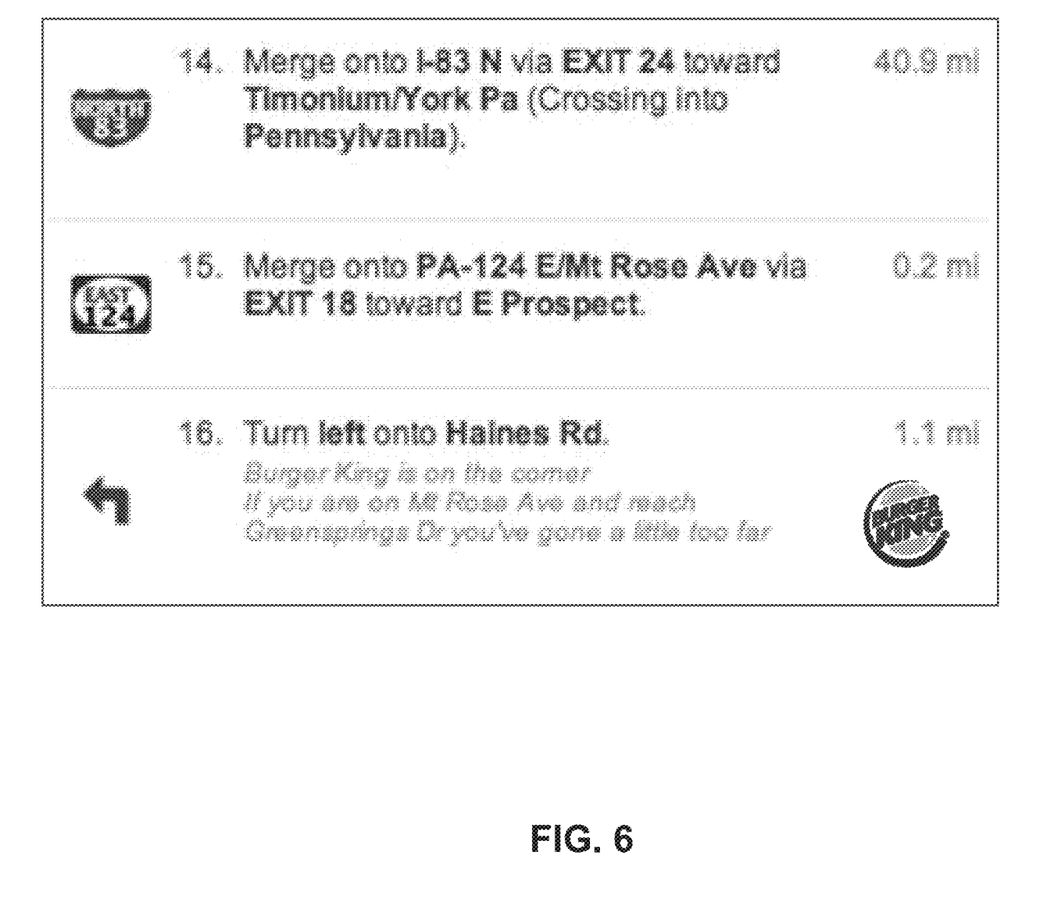
FIG. 6 depicts another exemplary advertisement that may be generated with systems and methods consistent with embodiments of the present disclosure.

FIG. 6 depicts another exemplary advertisement that may be generated with systems and methods consistent with embodiments of the present disclosure. The exemplary advertisement of FIG. 6 includes an area for a logo or other graphical item to a landmark location associated with a guidance maneuver in a route. For example, at guidance maneuver 16, a logo for Burger King may be displayed for the physical location of the Burger King establishment associated with the route maneuver of "Turn left onto Halnes Rd." The exemplary advertisement of FIG. 6 may be presented via the display of a users' handheld navigation device, mobile phone, or onboard vehicle navigation system. Alternatively, the exemplary advertisement of FIG. 6 may be presented in a list of guidance maneuvers provided to user 103 in a route to a particular destination (e.g., in a tangible list of guidance maneuvers or via a website associated with a mobile phone or computer).

Consistent with embodiments of the present disclosure, other forms of ads may be displayed in association with a landmark location or HVI. For example, the exemplary embodiment of FIG. 6 could be modified to display a full banner or video advertisement in place of a logo.

Figure 7:
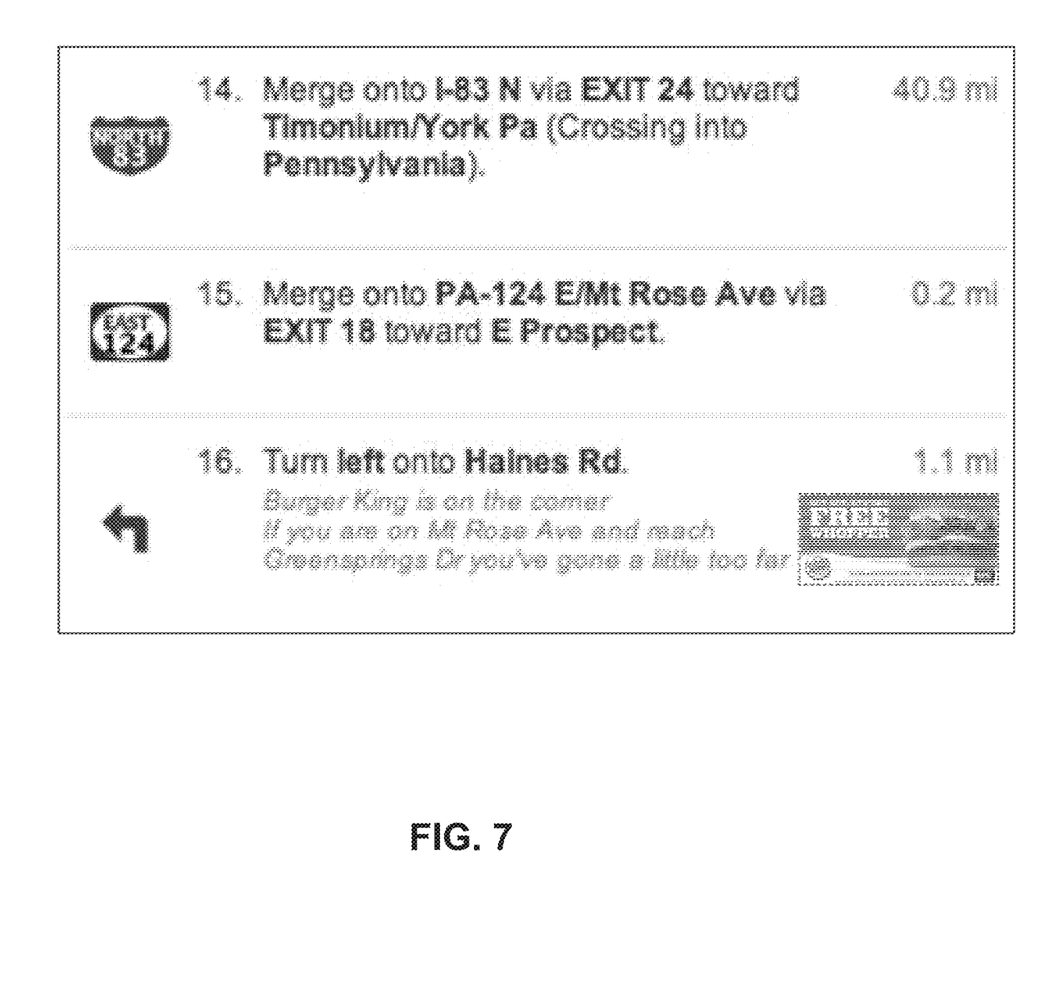
FIG. 7 depicts still another exemplary advertisement that may be generated with systems and methods consistent with embodiments of the present disclosure.

FIG. 7 depicts yet another exemplary advertisement that may be generated with systems and methods consistent with embodiments of the present disclosure. The exemplary advertisement of FIG. 7 includes an area for a coupon or other incentive to a landmark location associated with a guidance maneuver in a route. For example, at guidance maneuver 16, a coupon for Burger King may be displayed for the physical location of the Burger King establishment associated with the route maneuver of "Turn left onto Halnes Rd." The exemplary advertisement of FIG. 7 may be presented via the display of a users' handheld navigation device, mobile phone, or onboard vehicle navigation system. Alternatively, the exemplary advertisement of FIG. 7 may be presented in a list of guidance maneuvers provided to user 103 in a route to a particular destination (e.g., in a tangible list of guidance maneuvers or via a website associated with a mobile phone or computer).

Figure 8:
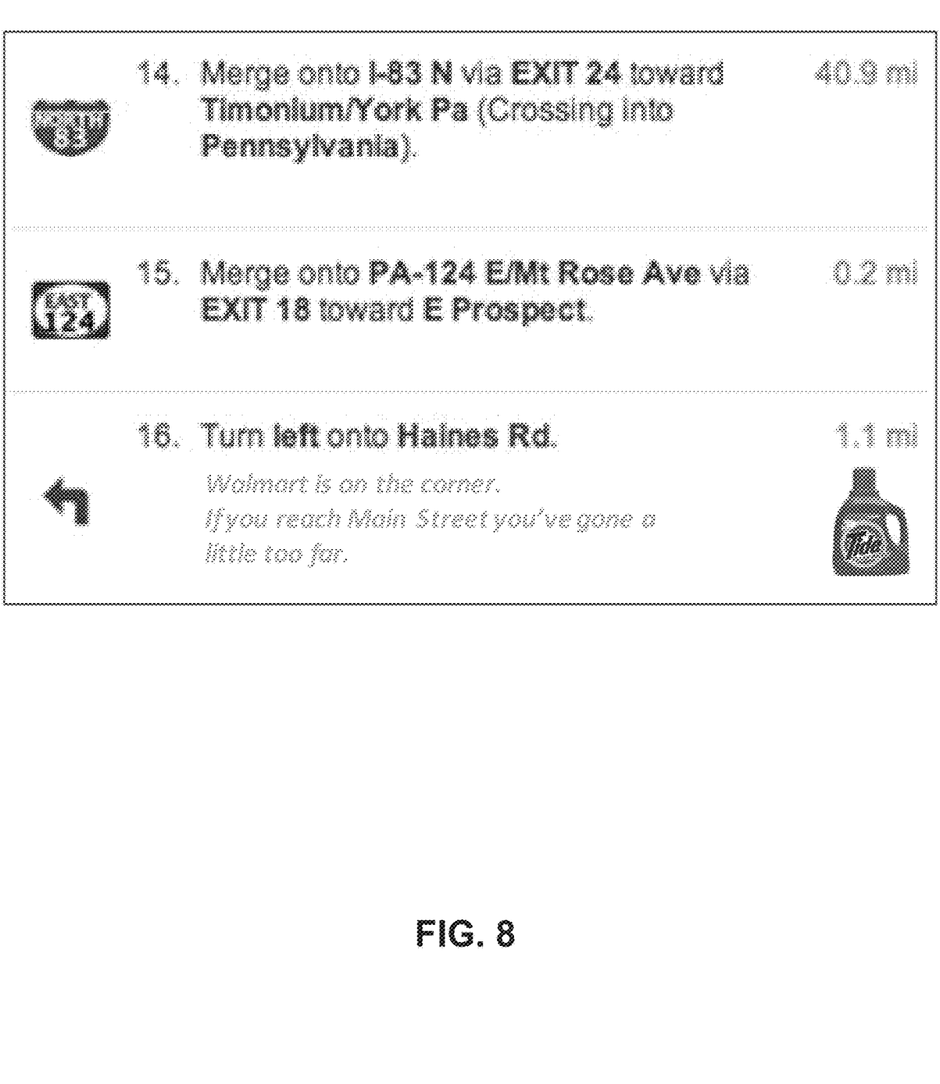
FIG. 8 depicts yet another exemplary advertisement that may be generated with systems and methods consistent with embodiments of the present disclosure.

FIG. 8 depicts still another exemplary advertisement that may be generated with systems and methods consistent with embodiments of the present disclosure. The exemplary advertisement of FIG. 8 includes an area for a logo associated with supplier 106, who sells products or services at retailer 104's landmark location associated with a guidance maneuver in a route. For example, at guidance maneuver 16, a logo of a product, Tide, may be displayed for the physical location of a landmark location of retailer 104 (e.g., Wal-Mart) associated with the route maneuver of "Turn left onto Halnes Rd." The exemplary advertisement of FIG. 8 may be presented via the display of a users' handheld navigation device, mobile phone, or onboard vehicle navigation system. Alternatively, the exemplary advertisement of FIG. 8 may be presented in a list of guidance maneuvers provided to user 103 in a route to a particular destination (e.g., in a tangible list of guidance maneuvers or via a website associated with a mobile phone or computer).

Figure 9:
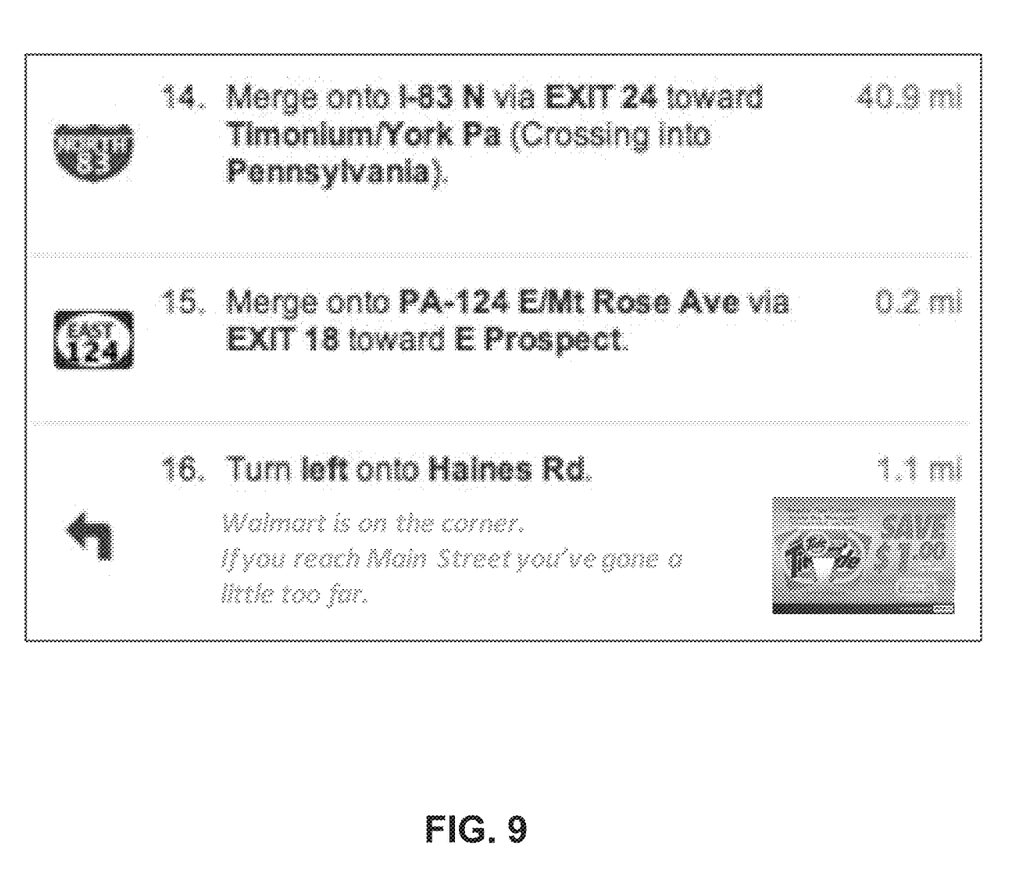
FIG. 9 depicts a further exemplary advertisement that may be generated with systems and methods consistent with embodiments of the present disclosure.

FIG. 9 depicts a further exemplary advertisement that may be generated with systems and methods consistent with embodiments of the present disclosure. The exemplary advertisement of FIG. 9 includes an area for a coupon associated with a product or service of supplier 106, who sells products or services at retailer 104's location associated with a guidance maneuver in a route. For example, at guidance maneuver 16, a coupon associated with a product, Tide, may be displayed for use at the physical location of retailer 104 (e.g., Wal-Mart) associated with the route maneuver of "Turn left onto Halnes Rd." The exemplary advertisement of FIG. 9 may be presented via the display of a users' handheld navigation device, mobile phone, or onboard vehicle navigation system. Alternatively, the exemplary advertisement of FIG. 9 may be presented in a list of guidance maneuvers provided to user 103 in a route to a particular destination (e.g., in a tangible list of guidance maneuvers or via a website associated with a mobile phone or computer).

While certain embodiments have been described with reference to intersections, embodiments consistent with the present disclosure can also be implemented with respect to other high-value locations, such as entertainment locations (e.g., movie theaters, shopping malls, sports venues, amusement parks, etc.), medical locations (e.g., hospitals, doctors' offices, etc.), education locations (e.g., colleges, universities, bookstores, etc.), and the like.

The foregoing description has been presented for purposes of illustration. It is not exhaustive and is not limiting to the precise forms or embodiments disclosed. Modifications and adaptations will be apparent to those skilled in the art from consideration of the specification and practice of the disclosed embodiments. For example, systems and methods consistent with the disclosed embodiments may be implemented as a combination of hardware and software or in hardware alone. Examples of hardware include computing or processing systems, including personal computers, laptops, mainframes, micro-processors and the like. Additionally, although aspects are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Programmable instructions, including computer programs, based on the written description and disclosed embodiments are within the skill of an experienced developer. The various programs or program modules can be created using any of the techniques known to one skilled in the art or can be designed in connection with existing software. For example, program sections or program modules can be designed in or by means of C#, Java, C++, HTML, XML, or HTML with included Java applets. One or more of such software sections or modules can be integrated into a computer system or existing e-mail or browser software.

Moreover, while illustrative embodiments have been described herein, the scope of thereof includes any and all embodiments having equivalent elements, modifications, omissions, combinations (e.g., of aspects across various embodiments), adaptations and/or alterations as would be appreciated by those in the art based on the present disclosure.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

It is intended, therefore, that the specification and examples be considered as exemplary only. Additional embodiments are within the purview of the present disclosure.

What is claimed is:

1. A method, comprising:
   querying, by a device, one or more databases to generate a set of intersections on a map,
      the set of intersections including information related to:
         traffic volume data,
         frequency of use, and
         demographic information;
   analyzing, by the device, at least one of:
      the traffic volume data,
      the frequency of use, or
      the demographic information associated with the set of intersections to identify a plurality of target intersections in the set of intersections for a navigated route;
   identifying, by the device and based on the plurality of target intersections, a set of landmark locations;
   detecting, by the device, at least one target intersection of the plurality of target intersections in a route requested by a user device of a user,
      the at least one target intersection comprising a plurality of intersecting roads, and
      the at least one target intersection being associated with metadata including information identifying at least one of:
         a classification of each of the plurality of intersecting roads,
         a latitude and longitude of the at least one target intersection,
         a name of each of the plurality of intersecting roads,
         a traffic messaging channel (TMC) code, or
         an open location referencing (OpenLR) code;
   receiving, by the device, GPS signals from a GPS system for determining a location of the user device;
   determining, by the device, that the user device is within a predetermined distance to the at least one target intersection of the plurality of target intersections in the route requested by the user device of the user;
   auctioning, by the device, an advertisement space to a plurality of advertisers for presenting an advertisement associated with at least one landmark location, of the set of landmark locations, associated with the route that includes the at least one target intersection;
   receiving, by the device and based on detecting the at least one target intersection, a request from at least one advertiser of the plurality of advertisers to reference at least one landmark location associated with the at least one advertiser, of the set of landmark locations, in association with a particular guidance maneuver of a plurality of guidance maneuvers,
      the plurality of guidance maneuvers being associated with the route requested by the user device of the user,
      the at least one advertiser offering a highest bid for the advertisement space; and
   providing, by the device for display on the user device of the user and responsive to receiving the request from the at least one advertiser, the plurality of guidance maneuvers and the advertisement,
      the advertisement being provided for display in association only with the particular guidance maneuver, and
      the advertisement being provided in relation to directions from the particular guidance maneuver to the at least one landmark location.

2. The method of claim 1, wherein the advertisement comprises a logo.

3. The method of claim 1, wherein the advertisement comprises a coupon for at least one of a product or a service sold at the at least one landmark location.

4. The method of claim 1, wherein the advertisement comprises a digital representation of the advertisement.

5. The method of claim 1, wherein identifying the set of landmark locations comprises:

querying a road database to identify landmark locations within a particular distance around at least one of the target intersections.

6. The method of claim 1, wherein identifying the set of landmark locations comprises:
querying a road database to identify one or more landmark locations within a radius of time around at least one of the plurality of target intersections.

7. The method of claim 1, further comprising:
receiving payment for the advertisement from the at least one advertiser associated with the at least one landmark location,
the at least one landmark location being associated with the at least one target intersection.

8. The method of claim 1, further comprising:
storing candidate landmark locations associated with each of the plurality of targeted intersections,
wherein the candidate landmark locations are updated at periodic time intervals.

9. The method of claim 1, further comprising:
querying at least one vendor that is not associated with the at least one landmark location;
receiving an indication that a vendor, of the at least one vendor, would like to advertise;
identifying at least one additional landmark location associated with the vendor;
associating the at least one additional landmark location with the at least one target intersection; and
storing an association between the at least one additional landmark location and the at least one target intersection.

10. The method of claim 1, wherein set of landmark locations are identified based on a road database.

11. A device, comprising:
one or more memories; and
one or more processors, communicatively coupled to the one or more memories, to:
query one or more databases to generate a set of intersections on a map,
the set of intersections including information related to:
traffic volume data,
frequency of use, and
demographic information;
analyze at least one of:
the traffic volume data,
the frequency of use, or the demographic information to identify a plurality of target intersections from the set of intersections in the map;
identify, based on the plurality of target intersections, a set of landmark locations;
detect at least one target intersection of the plurality of target intersections in a route requested by a user device of a user,
the at least one target intersection comprising a plurality of intersecting roads, and
the at least one target intersection being associated with metadata including information identifying at least one of:
a classification of each of the plurality of intersecting roads,
a latitude and longitude of the at least one target intersection,
a name of each of the plurality of intersecting roads,
a traffic messaging channel (TMC) code, or
an open location referencing (OpenLR) code;

receive GPS signals from a GPS system for determining a location of the user device;
determine that the user device is within a predetermined distance to the at least one target intersection of the plurality of target intersections in the route requested by the user device of the user;
auctioning an advertisement space to a plurality of advertisers for presenting an advertisement associated with at least one landmark location, of the set of landmark locations, associated with the route that includes the at least one target intersection;
receive, based on detecting the at least one target intersection, a request from at least one advertiser of the plurality of advertisers to reference at least one landmark location associated with the at least one advertiser, of the set of landmark locations, in association with a particular guidance maneuver of a plurality of guidance maneuvers,
the plurality of guidance maneuvers being associated with the route requested by the user device of the user,
the at least one advertiser offering a highest bid for the advertisement space; and
providing, for display on the user device of the user and responsive to receiving the request from the at least one advertiser, the plurality of guidance maneuvers and the advertisement,
the advertisement being provided for display in association only with the particular guidance maneuver, and
the advertisement being provided in relation to directions from the particular guidance maneuver to the at least one landmark location.

12. The device of claim 11, wherein the advertisement comprises a logo.

13. The device of claim 11, wherein the advertisement comprises a coupon for at least one of a product or a service sold at the at least one landmark location.

14. The device of claim 11, wherein the advertisement comprises a digital representation of the advertisement.

15. The device of claim 11, wherein the one or more processors, when identifying the set of landmark locations, are to:
query a road database to identify landmark locations within a particular distance around at least one of the target intersections.

16. The device of claim 11, wherein the one or more processors, when identifying the set of landmark locations, are to:
query a road database to identify one or more landmark locations within a radius of time around at least one of the plurality of target intersections.

17. The device of claim 11, where the one or more processors are further to:
receive payment for the advertisement from the at least one advertiser associated with the at least one landmark location,
the at least one landmark location being associated with the at least one target intersection.

18. A non-transitory computer-readable medium storing instructions, the instructions comprising:
one or more instructions that, when executed by one or more processors, cause the one or more processors to:
query one or more databases to generate a set of intersections on a map,
the set of intersections including:
traffic volume data, frequency of use, and
demographic information;
analyze the at least one of:
the traffic volume data,
the frequency of use, or
the demographic information to identify a plurality of target intersections from the set of intersections in the map for a navigated route;
receive GPS signals from a GPS system for determining a location of a user device of a user;
detect a presence of the user device of the user near at least one target intersection of the target intersections,
the user device of the user being detected based upon the received GPS signals,
the at least one target intersection comprising a plurality of intersecting roads, and
the at least one target intersection being associated with metadata including information identifying at least one of:
a classification of each of the plurality of intersecting roads,
a latitude and longitude of the at least one target intersection,
a name of each of the plurality of intersecting roads,
a traffic messaging channel (TMC) code, or
an open location referencing (OpenLR) code;
identify, based on the at least one target intersection, a set of landmark locations;
offer an advertisement space to a plurality of advertisers for presenting an advertisement associated with at least one landmark location, of the set of landmark locations, associated with a route that includes the at least one target intersection;
receive, in response to offering the advertisement space, a request from at least one advertiser of the plurality of advertisers to reference the at least one landmark location associated with the at least one advertiser and in association with a particular guidance maneuver of a plurality of guidance maneuvers,
the plurality of guidance maneuvers being associated with the route,
the at least one advertiser offering a highest bid for the advertisement space; and
provide, for display on the user device of the user and responsive to receiving the request from the at least one advertiser, the plurality of guidance maneuvers and the advertisement,
the advertisement being provided for display in association only with the particular guidance maneuver, and
the advertisement being provided in relation to directions from the particular guidance maneuver to the at least one landmark location.

19. The non-transitory computer-readable medium of claim 18, further comprising:
receiving payment from the at least one advertiser associated with the at least one landmark location.

20. The non-transitory computer-readable medium of claim 18, wherein the advertisement comprises a textual representation.

21. The non-transitory computer-readable medium of claim 18, wherein the advertisement comprises a logo.

22. The non-transitory computer-readable medium of claim 18, wherein the advertisement comprises a coupon for at least one of a product or a service sold at a business associated with the at least one landmark location.

23. The non-transitory computer-readable medium of claim 18, wherein the advertisement comprises a digital representation of the advertisement.

24. The method of claim 1, wherein the user device of the user includes at least one of:
a handheld navigation device,
a mobile phone, or
an onboard vehicle navigation system.

* * * * *